(12) United States Patent
Takano

(10) Patent No.: US 12,326,634 B2
(45) Date of Patent: *Jun. 10, 2025

(54) LIQUID CRYSTAL DISPLAY DEVICE WITH SEALANT IN CONTACT WITH INORGANIC ALIGNMENT FILMS

(71) Applicant: Japan Display Inc., Tokyo (JP)

(72) Inventor: Keisuke Takano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,442

(22) Filed: Apr. 30, 2024

(65) Prior Publication Data

US 2024/0280859 A1 Aug. 22, 2024

Related U.S. Application Data

(63) Continuation of application No. 18/313,589, filed on May 8, 2023, now Pat. No. 12,001,103, which is a (Continued)

(30) Foreign Application Priority Data

Oct. 1, 2013 (JP) ................................. 2013-206275

(51) Int. Cl.
  *G02F 1/1337* (2006.01)
  *G02F 1/1333* (2006.01)
  (Continued)

(52) U.S. Cl.
  CPC ...... *G02F 1/1337* (2013.01); *G02F 1/133345* (2013.01); *G02F 1/133512* (2013.01); *G02F 1/1339* (2013.01); *G02F 1/134309* (2013.01); *G02F 1/1368* (2013.01); *G02F 1/133742* (2021.01); *G02F 2201/121* (2013.01); *G02F 2201/123* (2013.01); *G02F 2201/40* (2013.01); *G02F 2202/10* (2013.01)

(58) Field of Classification Search
  None
  See application file for complete search history.

(56) References Cited

U.S. PATENT DOCUMENTS

| | | |
|---|---|---|
| 6,184,958 B1 | 2/2001 | Lim et al. |
| 6,989,879 B1 | 1/2006 | Nakahara et al. |

(Continued)

FOREIGN PATENT DOCUMENTS

| | | |
|---|---|---|
| JP | 4197233 B2 | 12/2008 |
| JP | 2012226188 A | 11/2012 |

*Primary Examiner* — Ryan Crockett
(74) *Attorney, Agent, or Firm* — Maier & Maier, PLLC

(57) ABSTRACT

According to one embodiment, a liquid crystal display device includes a first substrate including a first alignment film covering a pixel electrode, a second substrate including a second alignment film covering a second common electrode, a sealant attaching the first substrate and the second substrate, and a liquid crystal layer held between the first alignment film and the second alignment film, wherein the first alignment film and the second alignment film are formed of a material in which a principal chain is composed of silica ($SiO_2$), and extend at a position overlapping the sealant between an inner face and an outer face of the sealant.

7 Claims, 5 Drawing Sheets

Related U.S. Application Data continuation of application No. 17/676,462, filed on Feb. 21, 2022, now Pat. No. 11,681,183, which is a continuation of application No. 17/155,753, filed on Jan. 22, 2021, now Pat. No. 11,281,050, which is a continuation of application No. 16/717,575, filed on Dec. 17, 2019, now Pat. No. 10,948,781, which is a continuation of application No. 15/895,494, filed on Feb. 13, 2018, now Pat. No. 10,551,679, which is a continuation of application No. 15/203,544, filed on Jul. 6, 2016, now Pat. No. 9,933,660, which is a continuation of application No. 14/503,544, filed on Oct. 1, 2014, now Pat. No. 9,411,201.

(51) Int. Cl.
*G02F 1/1335* (2006.01)
*G02F 1/1339* (2006.01)
*G02F 1/1343* (2006.01)
*G02F 1/1368* (2006.01)

(56) References Cited

U.S. PATENT DOCUMENTS

| | | | |
|---|---|---|---|
| 9,274,379 B2 | 3/2016 | Nagami | |
| 10,054,823 B2* | 8/2018 | Fukuoka | G02F 1/13394 |
| 10,101,618 B2 | 10/2018 | Abe et al. | |
| 2003/0122978 A1 | 7/2003 | Lim | |
| 2005/0128396 A1* | 6/2005 | Tsuchiya | G02F 1/133707 |
| | | | 349/123 |
| 2006/0077334 A1* | 4/2006 | Kim | G02F 1/1339 |
| | | | 349/153 |
| 2006/0197902 A1 | 9/2006 | Cho et al. | |
| 2007/0146598 A1* | 6/2007 | Yokokawa | G02F 1/1337 |
| | | | 349/123 |
| 2008/0137022 A1 | 6/2008 | Komeno et al. | |
| 2008/0151149 A1 | 6/2008 | Lee et al. | |
| 2009/0128766 A1 | 5/2009 | Kawamura et al. | |
| 2010/0066961 A1* | 3/2010 | Matsui | G02F 1/133723 |
| | | | 349/129 |
| 2011/0074748 A1* | 3/2011 | Cho | G02F 1/13454 |
| | | | 345/87 |
| 2011/0102719 A1* | 5/2011 | Kakehi | G02F 1/134363 |
| | | | 349/122 |
| 2012/0314148 A1* | 12/2012 | Yamaguchi | G02F 1/1339 |
| | | | 257/59 |
| 2013/0057815 A1* | 3/2013 | Takano | G02F 1/134309 |
| | | | 349/123 |
| 2013/0182207 A1* | 7/2013 | Fukuoka | G02F 1/133345 |
| | | | 349/138 |
| 2013/0330858 A1 | 12/2013 | Shiromoto et al. | |
| 2014/0211136 A1* | 7/2014 | Fukuoka | G02F 1/13394 |
| | | | 349/106 |
| 2014/0253851 A1* | 9/2014 | Takano | G02F 1/134309 |
| | | | 349/123 |
| 2015/0029432 A1* | 1/2015 | Ishikawa | G02F 1/13394 |
| | | | 349/43 |
| 2015/0062515 A1* | 3/2015 | Tomioka | G02F 1/133345 |
| | | | 349/123 |
| 2015/0092148 A1 | 4/2015 | Takano | |
| 2015/0109565 A1 | 4/2015 | Takeda et al. | |
| 2015/0109567 A1 | 4/2015 | Tago et al. | |
| 2015/0109568 A1* | 4/2015 | Kozuka | G09G 3/3607 |
| | | | 349/138 |
| 2015/0109569 A1* | 4/2015 | Kunimatsu | G02F 1/133788 |
| | | | 349/123 |
| 2015/0131041 A1* | 5/2015 | Moriwaki | G02F 1/1337 |
| | | | 349/123 |
| 2015/0185578 A1 | 7/2015 | Hirosawa | |
| 2015/0212373 A1 | 7/2015 | Hirota | |
| 2016/0178943 A1* | 6/2016 | Hyodo | G02F 1/133345 |
| | | | 349/43 |
| 2017/0010500 A1 | 1/2017 | Han | |
| 2019/0129270 A1 | 5/2019 | Ishizaki et al. | |

* cited by examiner

LIQUID CRYSTAL DISPLAY DEVICE WITH SEALANT IN CONTACT WITH INORGANIC ALIGNMENT FILMS

CROSS-REFERENCE TO RELATED APPLICATIONS

This application is a continuation of U.S. patent application Ser. No. 18/313,589, filed May 8, 2023, which is a continuation of U.S. patent application Ser. No. 17/676,462, filed Feb. 21, 2022, now U.S. Pat. No. 11,681,183, issued Jun. 20, 2023, which is a continuation of U.S. patent application Ser. No. 17/155,753, filed Jan. 22, 2021, now U.S. Pat. No. 11,281,050, issued Mar. 22, 2022, which is a continuation of U.S. patent application Ser. No. 16/717,575, filed Dec. 17, 2019, now U.S. Pat. No. 10,948,781, issued Mar. 16, 2021, which is a continuation of U.S. patent application Ser. No. 15/895,494, filed Feb. 13, 2018, now U.S. Pat. No. 10,551,679, issued Feb. 4, 2020, which is a continuation of U.S. patent application Ser. No. 15/203,544, filed Jul. 6, 2016, now U.S. Pat. No. 9,933,660, issued Apr. 3, 2018, which is a continuation of U.S. patent application Ser. No. 14/503,544, filed Oct. 1, 2014, now U.S. Pat. No. 9,411,201, issued Aug. 9, 2016, which is based upon and claims the benefit of priority from Japanese Patent Application No. 2013-206275, filed Oct. 1, 2013, the entire contents of each of which are incorporated herein by reference.

FIELD

Embodiments described herein relate generally to a liquid crystal display device.

BACKGROUND

In recent years, in active-matrix-type liquid crystal display devices including switching elements in respective pixels, a structure mainly using a vertical electric field, such as a vertical aligned mode, has been put to practical use. In such a liquid crystal display device of a vertical electric field mode, liquid crystal molecules are switched by a vertical electric field which is produced between a pixel electrode formed on an array substrate and a common electrode formed on a counter-substrate.

In the meantime, in the liquid crystal display device, an alignment film is required in order to uniformize alignment directions of liquid crystal molecules in a state in which no voltage is applied to a liquid crystal layer. In general, an alignment film is formed by using an organic material such as polyimide. In recent years, however, there has been proposed a technique of forming the alignment film by an inorganic material such as silicon dioxide ($SiO_2$).

DETAILED DESCRIPTION

Figure 1:
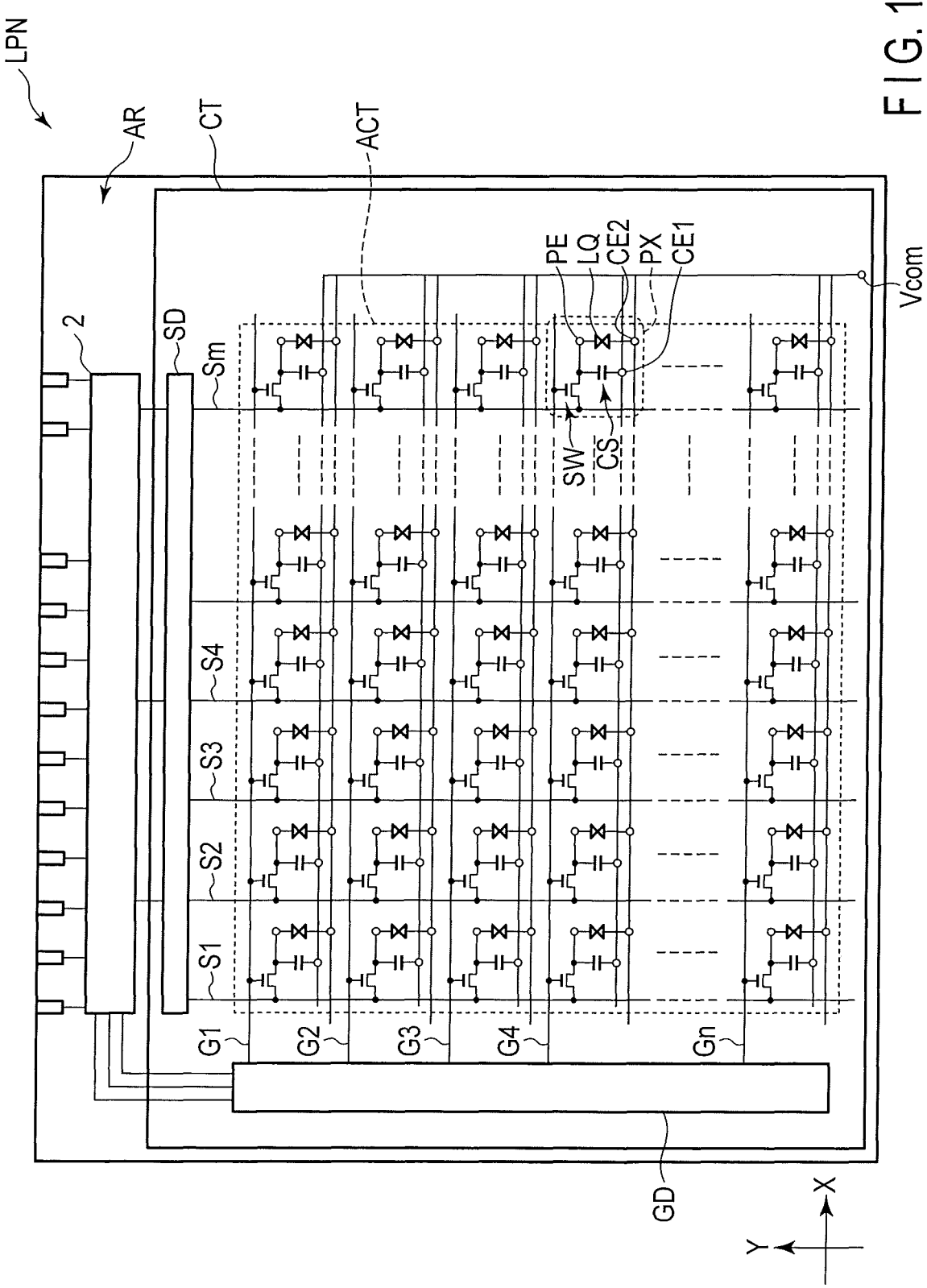
FIG. 1 is a view which schematically illustrates a structure and an equivalent circuit of a liquid crystal display panel LPN which constitutes a liquid crystal display device according to an embodiment.

In general, according to one embodiment, a liquid crystal display device includes: a first substrate including a first insulative substrate, a switching element located above the first insulative substrate, a first interlayer insulation film covering the switching element, a first common electrode formed on the first interlayer insulation film, a second interlayer insulation film covering the first common electrode, a pixel electrode formed on the second interlayer insulation film and electrically connected to the switching element, and a first alignment film covering the pixel electrode; a second substrate including a second insulative substrate, a second common electrode extending on that side of the second insulative substrate, which is opposed to the first substrate, and having the same potential as the first common electrode, and a second alignment film covering the second common electrode; a sealant attaching the first substrate and the second substrate in a state in which a cell gap is created between the first substrate and the second substrate; and a liquid crystal layer including liquid crystal molecules held between the first alignment film and the second alignment film, wherein the first alignment film and the second alignment film are formed of a material in which a principal chain is composed of silica ($SiO_2$), and extend at a position overlapping the sealant between an inner face and an outer face of the sealant.

According to another embodiment, a liquid crystal display device includes: a first substrate including a first insulative substrate, a switching element located above the first insulative substrate, a first interlayer insulation film covering the switching element and including an end face on an inside of a first substrate end portion of the first insulative substrate, a second interlayer insulation film covering the end face of the first interlayer insulation film and extending to the first substrate end portion, a pixel electrode formed on the second interlayer insulation film and electrically connected to the switching element, and a first alignment film covering the pixel electrode and extending to the first substrate end portion; a second substrate including a second insulative substrate, a second common electrode extending on that side of the second insulative substrate, which is opposed to the first substrate, and a second alignment film covering the second common electrode and extending to a second substrate end portion of the second insulative substrate; a sealant which is in close contact with the first alignment film and the second alignment film and attaches the first substrate and the second substrate in a state in which a cell gap is created between the first substrate and the second substrate; and a liquid crystal layer including liquid crystal molecules held between the first alignment film and the second alignment film, wherein the first alignment film and the second alignment film are formed of a material in which a principal chain is composed of silica ($SiO_2$).

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display panel LPN which constitutes a liquid crystal display device according to an embodiment.

Specifically, the liquid crystal display device includes an active-matrix-type liquid crystal display panel LPN. The liquid crystal display panel LPN is configured to include an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT corresponds to a region where the liquid crystal layer LQ is held between the array substrate AR and the counter-substrate CT, has a rectangular shape, for instance, and is composed of a plurality of pixels PX which are arrayed in a matrix.

The array substrate AR includes, in the active area ACT, a plurality of gate lines G (G1 to Gn) extending in a first direction X, a plurality of source lines S (S1 to Sm) extending in a second direction Y crossing the first direction X, a switching element SW which is electrically connected to the gate line G and source line S in each pixel PX, a pixel electrode PE which is electrically connected to the switching element SW in each pixel PX, and a first common electrode CE1 which is opposed to the pixel electrode PE. A storage capacitance CS is formed, for example, between the first common electrode CE1 and the pixel electrode PE.

On the other hand, the counter-substrate CT includes, for example, a second common electrode CE2 which is opposed to the pixel electrode PE via the liquid crystal layer LQ.

Each of the gate lines G is led out to the outside of the active area ACT and is connected to a first driving circuit GD. Each of the source lines S is led out to the outside of the active area ACT and is connected to a second driving circuit SD. At least parts of the first driving circuit GD and second driving circuit SD are formed on, for example, the array substrate AR, and are connected to a driving IC chip 2. The driving IC chip 2 incorporates a controller which controls the first driving circuit GD and second driving circuit SD, and functions as a signal supply source for supplying necessary signals for driving the liquid crystal display panel LPN. In the example illustrated, the driving IC chip 2 is mounted on the array substrate AR, on the outside of the active area ACT of the liquid crystal display panel LPN.

The first common electrode CE1 and second common electrode CE2 have the same potential, and each of them extends over substantially the entirety of the active area ACT and is formed commonly over a plurality of pixels PX. The first common electrode CE1 and second common electrode CE2 are led out to the outside of the active area ACT and are connected to a power supply module Vcom. The power supply module Vcom is formed, for example, on the array substrate AR on the outside of the active area ACT, and is electrically connected to the first common electrode CE1 and also electrically connected to the second common electrode CE2 via an electrically conductive member (not shown). At the power supply module Vcom, for example, a common potential is supplied to the first common electrode CE1 and second common electrode CE2.

Figure 2:
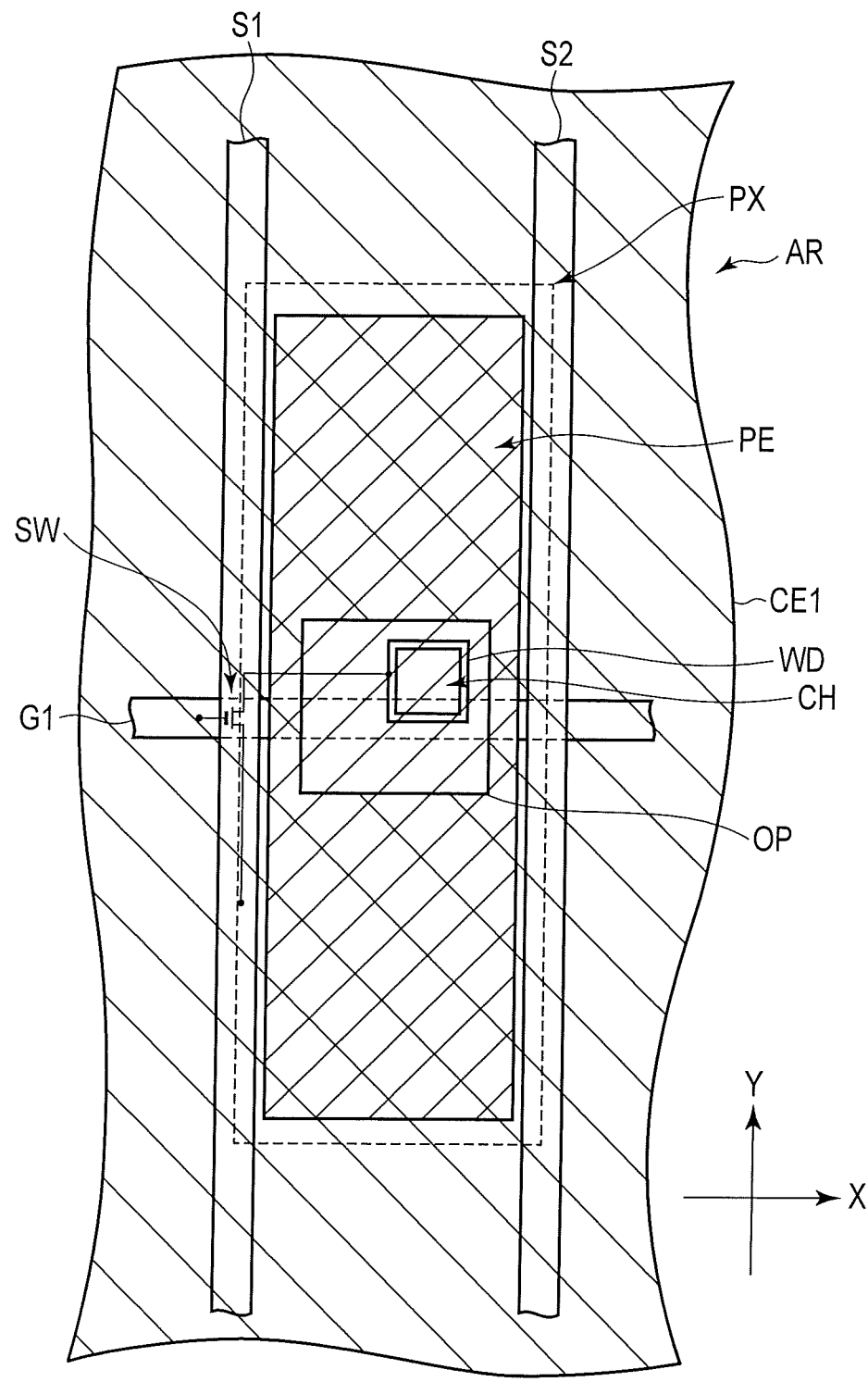
FIG. 2 is a plan view which schematically illustrates a structure example of one pixel PX of an array substrate AR which is applicable to the liquid crystal display device of the embodiment.

FIG. 2 is a plan view which schematically shows a structure example of one pixel PX of the array substrate AR which is applicable to the liquid crystal display device of the embodiment.

The array substrate AR includes a gate line G1, a source line S1, a source line S2, a switching element SW, a first common electrode CE1, and a pixel electrode PE. In the example illustrated, as indicated by a broken line in FIG. 2, the pixel PX has a rectangular shape with a pair of short sides parallel to the first direction X, and a pair of long sides parallel to the second direction Y.

The gate line G1 extends linearly in the first direction X. The source line S1 and source line S2 are disposed with a distance in the first direction X, and extend linearly in the second direction Y, respectively. The length of the pixel PX in the first direction X is substantially equal to the pitch of neighboring source lines in the first direction X. The length of the pixel PX in the second direction Y is substantially equal to the pitch of neighboring gate lines in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line G1 is disposed in a manner to cross a central portion of the pixel PX. In the present embodiment, as illustrated, there is no storage capacitance line which crosses the pixel PX for forming a storage capacitance CS.

The switching element SW is composed of, for example, an n-channel thin-film transistor (TFT). Although a detailed illustration is omitted, the switching element SW includes a semiconductor layer of, e.g. polysilicon, a gate electrode connected to the gate line G1, a source electrode which is connected to the source line S1 and is put in contact with the semiconductor layer, and a drain electrode WD which is put in contact with the semiconductor layer.

As indicated by lower-right hatching lines in the Figure, the first common electrode CE1 is disposed over substantially the entirety of the pixel PX, and further extends from the pixel PX beyond the source line S1 and source line S2 in the first direction X and extends in the second direction Y. Specifically, the first common electrode CE1 is opposed to the source line S1 and source line S2 and is formed continuously over pixels neighboring the pixel PX in the first direction X. In addition, the first common electrode CE1 is formed continuously over pixels neighboring the pixel PX in the second direction Y. Furthermore, although not described in detail, the first common electrode CE1 is disposed over substantially the entirety of the active area which displays an image, and a part thereof is led out to the outside of the active area and electrically connected to the power supply module, as described above. It should be noted, however, that an opening OP for exposing the drain electrode WD is formed in the first common electrode CE1.

In the meantime, the first common electrode CE1 may be formed such that, while the first common electrode CE1 is disposed over substantially the entirety of the pixel PX, the first common electrode CE1 is made discontinuous at an area overlapping the gate line G1, the first common electrode CE1 extends from the pixel PX over the source line S1 and source line S2 in the first direction X, the first common electrode CE1 is opposed to the source line S1 and source line S2, and the first common electrode CE1 is continuously formed in a strip shape over pixels neighboring the pixel PX in the first direction X. In this case, too, the first common electrode CEL is led out to the outside of the active area which displays an image, and is electrically connected to the power supply module, as described above.

As indicated by upper-right hatching lines in the Figure, the pixel electrode PE is formed in an island shape in the pixel PX, and is opposed to the first common electrode CE1. Incidentally, in the example illustrated, although only the pixel electrode PE disposed in the pixel PX is depicted, pixel electrodes are also disposed in other pixels neighboring the pixel PX in the first direction X and second direction Y. The pixel electrode PE is electrically connected to the drain electrode WD of the switching element SW via a contact hole CH. The shape of the pixel electrode PE illustrated corresponds to, for example, the shape of the pixel PX, and is a rectangular shape having a less length in the first direction X than in the second direction Y. The contact hole CH is located at a substantially central part of the pixel electrode PE. Incidentally, a part of the pixel electrode PE may extend to positions overlapping the source line S1 and source line S2.

In the present embodiment, the structure of each pixel of the active area is identical to the above-described structure example. However, the active area may include pixels of different pixel sizes, i.e. different lengths in the first direction X and second direction Y.

Figure 3:
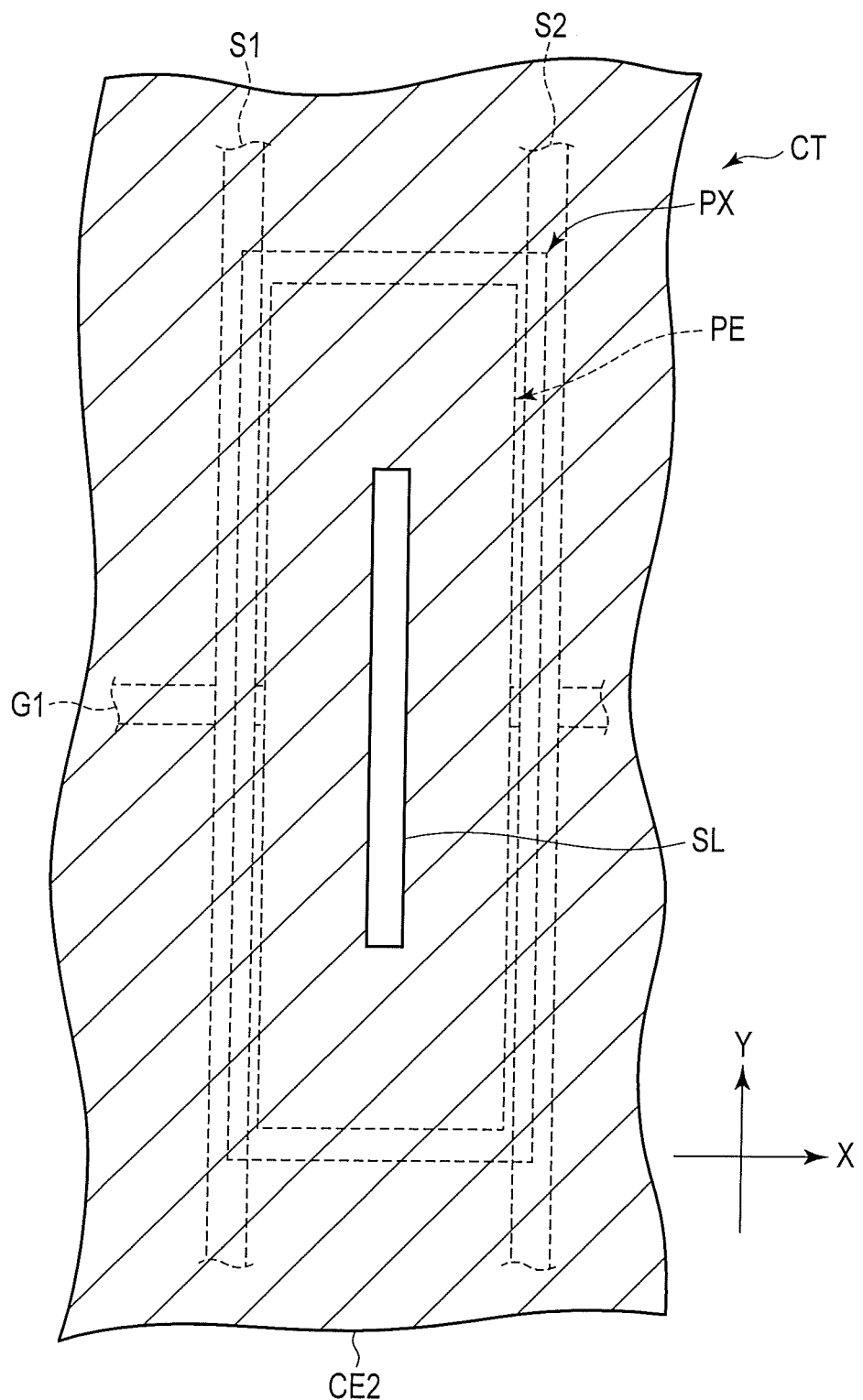
FIG. 3 is a plan view which schematically illustrates a structure example of one pixel PX of a counter-substrate CT which is applicable to the liquid crystal display device of the embodiment.

FIG. 3 is a plan view which schematically shows a structure example of one pixel PX of the counter-substrate CT which is applicable to the liquid crystal display device of the embodiment. FIG. 3 shows only structural parts that are necessary for the description, and the source line S1, source line S2, gate line G1, and pixel electrode PE, which are main parts of the array substrate, are indicated by broken lines, and the depiction of the first common electrode is omitted.

The counter-substrate CT includes a second common electrode CE2. The second common electrode CE2 is disposed in the pixel PX, and is opposed to the pixel electrode PE. In addition, the second common electrode CE2 extends from the pixel PX in the first direction X and the second direction Y, and is located also above the source line S1 and source line S2. Specifically, although not described in detail, the second common electrode CE2 is disposed continuously over pixels neighboring on the right side and left side along the first direction X of the pixel PX, and pixels neighboring on the upper side and lower side along the second direction Y of the pixel PX. Furthermore, although not described in detail, the second common electrode CE2 is disposed over substantially the entirety of the active area.

A slit SL is formed in the second common electrode CE2 at a position opposed to the pixel electrode PE. In the example illustrated, the slit SL is formed in a strip shape extending in the second direction Y, and is located substantially at a central part of the pixel PX. This slit SL corresponds to an alignment control member which mainly controls the alignment of liquid crystal molecules. In the meantime, instead of the slit, some other alignment control member, such as a projection stacked on the second common electrode CE2, may be disposed, if such an alignment control member has a function of controlling the alignment of liquid crystal molecules. In addition, the shape of the slit SL is not limited to the example illustrated, and may be, for instance, a cross shape.

Figure 4:
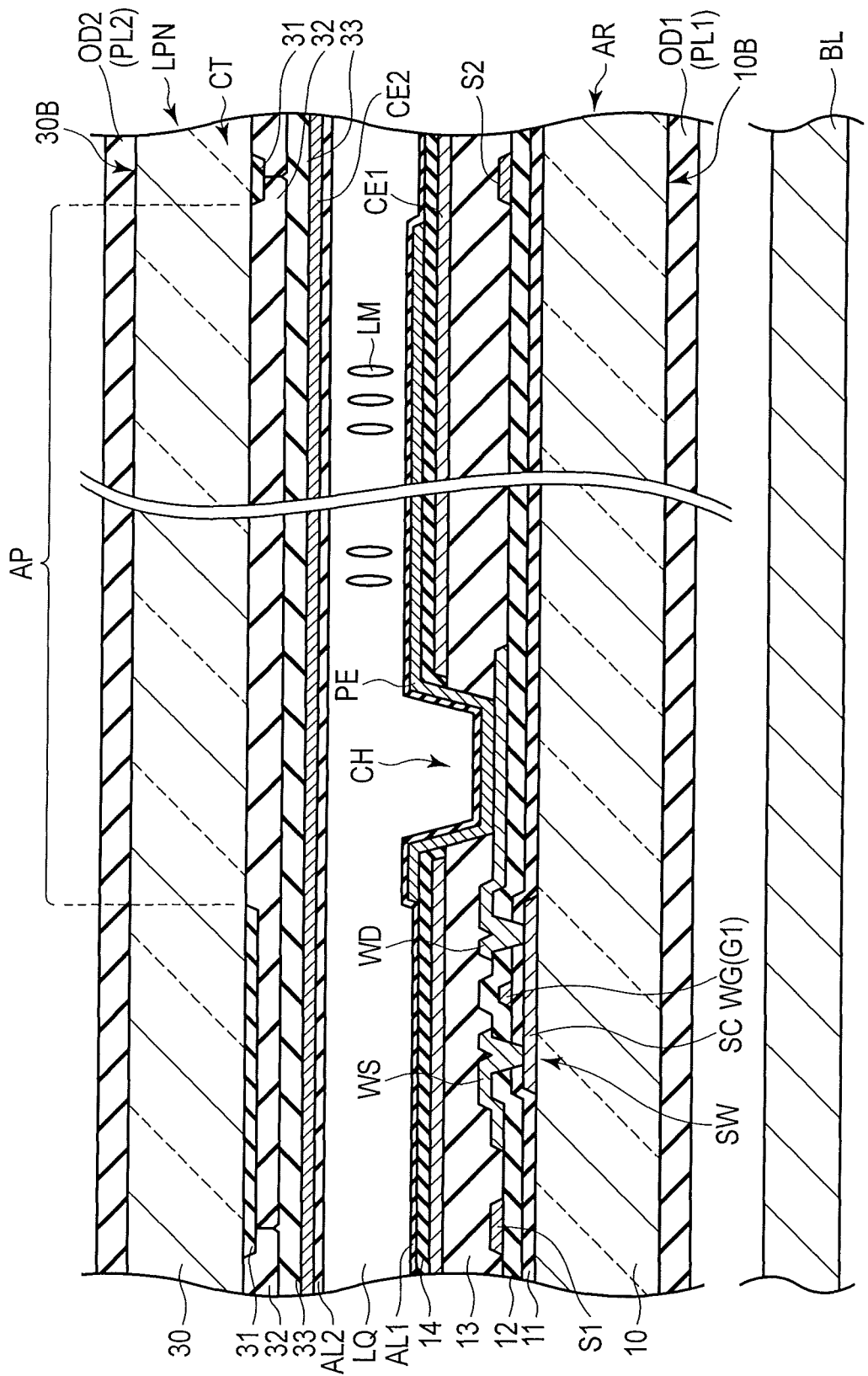
FIG. 4 is a view which schematically illustrates a cross-sectional structure of the liquid crystal display panel LPN in an active area including a switching element SW shown in FIG. 2.

FIG. 4 is a view which schematically illustrates a cross-sectional structure of the liquid crystal display panel LPN in the active area including the switching element SW shown in FIG. 2.

The array substrate AR is formed by using a first insulative substrate 10 having light transmissivity, such as a glass substrate or a resin substrate. The array substrate AR includes, on that side of the first insulative substrate 10, which is opposed to the counter-substrate CT, a switching element SW, a first common electrode CE1, a pixel electrode PE, a first insulation film 11, a second insulation film 12, a third insulation film 13, a fourth insulation film 14, and a first alignment film AL1.

In the example illustrated, the switching element SW is a thin-film transistor of a top gate type. The switching element SW includes a semiconductor layer SC which is disposed on the first insulative substrate 10. In the meantime, an undercoat layer, which is an insulation film, may be interposed between the first insulative substrate 10 and the semiconductor layer SC. The semiconductor layer SC is covered with the first insulation film 11. The first insulation film 11 is also disposed on the first insulative substrate 10. This first insulation film 11 is formed of, for example, an inorganic material such as silicon nitride.

A gate electrode WG of the switching element SW is formed on the first insulation film 11, and is located immediately above the semiconductor layer SC. The gate electrode WG is electrically connected to the gate line G1 (or formed integral with the gate line G1) and is covered with the second insulation film 12. The second insulation film 12 is also disposed on the first insulation film 11. This second insulation film 12 is formed of, for example, an inorganic material such as tetraethoxysilane (TEOS).

A source electrode WS and a drain electrode WD of the switching element SW are formed on the second insulation film 12. The source line S1 and source line S2 are similarly formed on the second insulation film 12. The source electrode WS illustrated is electrically connected to the source line S1 (or formed integral with the source line S1). The source electrode WS and drain electrode WD are put in contact with the semiconductor layer SC via contact holes penetrating the first insulation film 11 and second insulation film 12. The switching element SW with this structure, as well as the source line S1 and source line S2, is covered with the third insulation film 13. The third insulation film 13 is also disposed on the second insulation film 12. This third insulation film 13 is formed of, for example, a transparent resin material.

This third insulation film 13 corresponds to a first interlayer insulation film which covers the source line S1, source line S2 and switching element SW.

The first common electrode CE1 extends over the third insulation film 13. As illustrated in the Figure, the first common electrode CE1 covers the upper side of the source line S1 and source line S2, and extends toward neighboring pixels. The first common electrode CE1 is formed of a transparent, electrically conductive material such as indium tin oxide (ITO) or indium zinc oxide (IZO). The fourth insulation film 14 is disposed on the first common electrode CE1. A contact hole CH, which penetrates to the drain electrode WD, is formed in the third insulation film 13 and fourth insulation film 14. The fourth insulation film 14 has a less thickness than the third insulation film 13, and is formed of, for example, an inorganic material such as silicon nitride.

This fourth insulation film 14 corresponds to a second interlayer insulation film which covers the first common electrode CE1.

The pixel electrode PE is formed in an island shape on the fourth insulation film 14 and is opposed to the first common electrode CE1. The pixel electrode PE is electrically connected to the drain electrode WD of the switching element SW via the contact hole CH. This pixel electrode PE is formed of a transparent, electrically conductive material such as ITO or IZO. The pixel electrode PE is covered with the first alignment film AL1.

On the other hand, the counter-substrate CT is formed by using a second insulative substrate 30 with light transmissivity, such as a glass substrate or a resin substrate. The counter-substrate CT includes, on that side of the second insulative substrate 30, which is opposed to the array substrate AR, a light-shield layer 31, color filters 32, an overcoat layer 33, a second common electrode CE2, and a second alignment film AL2.

The light-shield layer 31 partitions each pixel PX in the active area ACT, and forms an aperture portion AP. The light-shield layer 31 is provided at boundaries between color pixels, or at positions opposed to the source lines provided on the array substrate AR and positions opposed to the switching elements provided on the array substrate AR. The light-shield layer 31 is formed of a light-shielding metallic material or a black resin material.

The color filter 32 is formed in the aperture portion AP, and a part thereof overlaps the light-shield layer 31. The color filters 32 include, for example, a red color filter formed of a resin material which is colored in red, a green color filter formed of a resin material which is colored in green, and a blue color filter formed of a resin material which is colored in blue. The red color filter is disposed in a red pixel which displays red, the green color filter is disposed in a green pixel which displays green, and the blue color filter is disposed in a blue pixel which displays blue. In addition, a white (or transparent) color filter is disposed in a white pixel which displays white. Incidentally, no color filter may be disposed in the white pixel. Besides, the white color filter may not strictly be an achromatic color filter, and may be a color filter which is lightly colored (e.g. colored in light yellow). Boundaries between the color filters 32 of different colors are located at positions overlapping the light-shield layer 31 above the source lines S.

The overcoat layer 33 covers the color filters 32. The overcoat layer 33 planarizes asperities of the light-shield layer 31 and color filters 32. The overcoat layer 33 is formed of, for example, a transparent resin material. This overcoat layer 33 serves as an underlayer of the second common electrode CE2.

The second common electrode CE2 is formed on that side of the overcoat layer 33, which is opposed to the array substrate AR. As illustrated in the Figure, the second common electrode CE2 extends above the source line S1 and source line S2, and extends toward the neighboring pixels. The second common electrode CE2 is formed of, for example, a transparent, electrically conductive material such as ITO or IZO. The second common electrode CE2 is covered with the second alignment film AL2.

The first alignment film AL1 and second alignment film AL2 are formed of a material which exhibits vertical alignment properties, and have an alignment restriction force which aligns liquid crystal molecules in a normal direction of the array substrate AR or counter-substrate CT, without requiring alignment treatment such as rubbing.

In the present embodiment, the first alignment film AL1 and second alignment film AL2 are formed of a material in which a principal chain is composed of silica ($SiO_2$).

The above-described array substrate AR and counter-substrate CT are disposed such that their first alignment film AL1 and second alignment film AL2 are opposed to each other. In this case, a predetermined cell gap is created between the array substrate AR and the counter-substrate CT by columnar spacers which are formed on one of the array substrate AR and counter-substrate CT. The array substrate AR and counter-substrate CT are attached by a sealant in the state in which the cell gap is created. The liquid crystal layer LQ is sealed between the first alignment film AL1 and second alignment film AL2. This liquid crystal layer LQ is composed of a liquid crystal composition with a negative (negative-type) dielectric constant anisotropy.

A backlight unit BL is disposed on the back side of the liquid crystal display panel LPN having the above-described structure. Various modes are applicable to the backlight unit BL, but a description of the detailed structure of the backlight unit BL is omitted here.

A first optical element OD1 including a first polarizer PL1 is disposed on an outer surface 10B of the first insulative substrate 10. A second optical element OD2 including a second polarizer PL2 is disposed on an outer surface 30B of the second insulative substrate 30. The first polarizer PL1 and second polarizer PL2 are disposed, for example, in a positional relationship of crossed Nicols in which their polarization axes are perpendicular to each other.

Figure 5:
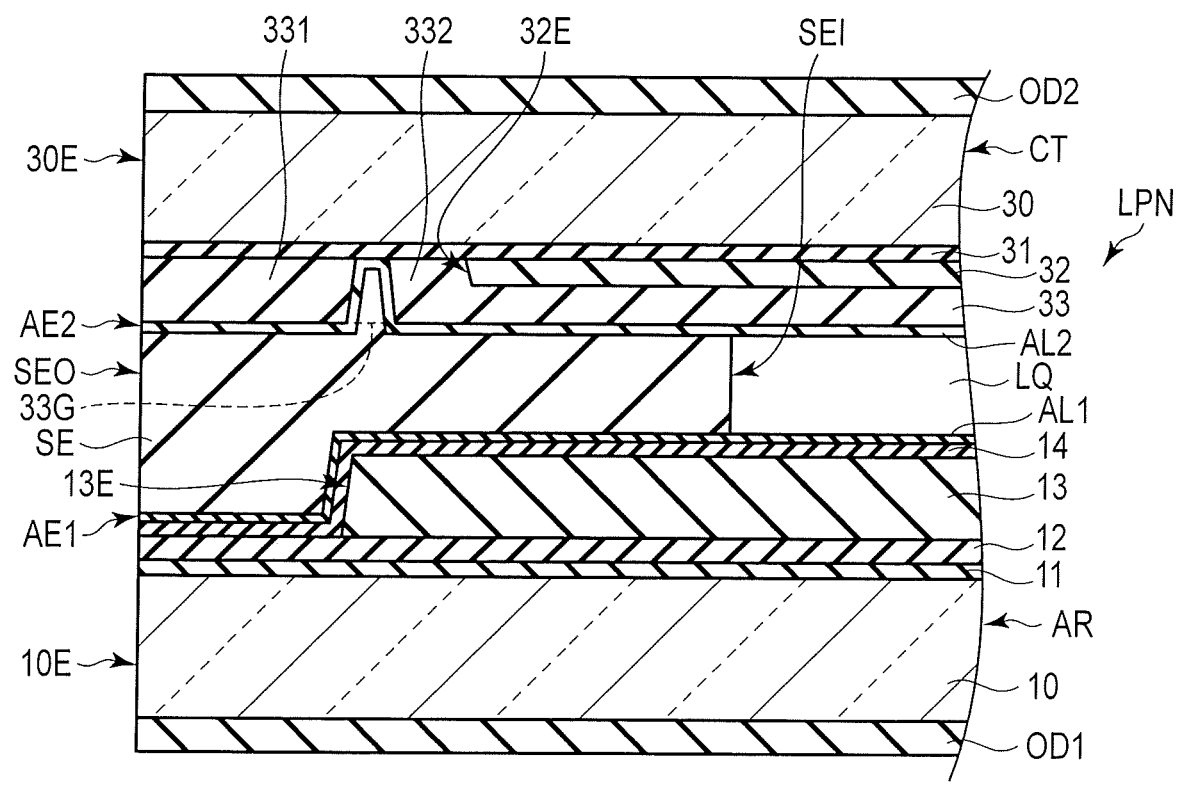
FIG. 5 is a cross-sectional view which schematically illustrates a cross-sectional structure of an end portion of the liquid crystal display panel LPN.

FIG. 5 is a cross-sectional view which schematically illustrates a cross-sectional structure of an end portion of the liquid crystal display panel LPN.

Specifically, in the array substrate AR, the first insulation film 11 and second insulation film 12 extend to a substrate end portion 10E of the first insulative substrate 10. The third insulation film 13 has an end face 13E on the inside of the substrate end portion 10E. The fourth insulation film 14 is disposed in a manner to cover the end face 13E, extends further to the outside, and extends to the substrate end portion 10E. In the vicinity of the substrate end portion 10E, the fourth insulation film 14 overlaps the second insulation film 12. The first alignment film AL1 is disposed on the fourth insulation film 14, and continuously extends to the substrate end portion 10E. Specifically, the entirety of the first alignment film AL1 is stacked on the fourth insulation film 14.

On the other hand, in the counter-substrate CT, the light-shield layer 31 extends to a substrate end portion 30E of the second insulative substrate 30. The color filter 32 has an end face 32E on the inside of the substrate end portion 30E. The overcoat layer 33 is formed discontinuous on the inside of the substrate end portion 30E. Specifically, in the overcoat layer 33, a groove 33G reaching the light-shield layer 31 is formed between a segment 331 which extends to the substrate end portion 30E and a segment 332 which is located inside the substrate end portion 30E. The second alignment film AL2 is disposed in a manner to cover the overcoat layer 33, and continuously extends to the substrate end portion 30E. Specifically, the second alignment film AL2 covers the segment 331 and segment 332, and is also filled in the groove 33G.

The array substrate AR and counter-substrate CT are attached by a sealant SE. The sealant SE illustrated includes an inner face SEI which is in contact with the liquid crystal layer LQ, and an outer face SEO which is located on the side of the substrate end portion 10E and substrate end portion 30E. The width of the sealant SE corresponds to a distance from the inner face SEI to the outer face SEO in a direction parallel to the substrate major surface.

If attention is paid to the positional relationship between this sealant SE and the first alignment film AL1 and second alignment film AL2, the first alignment film AL1 and second alignment film AL2 extend at a position overlapping the sealant SE between the inner face SEI and outer face SEO of the sealant SE. Specifically, the first alignment film AL1 and second alignment film AL2 overlap the sealant SE over the entire width of the sealant SE. Each of an end face AE1 of the first alignment film AL1 and an end face AE2 of the second alignment film AL2 is exposed from the sealant SE.

Incidentally, in the array substrate AR, the respective end faces of the first insulation film 11, second insulation film 12 and fourth insulation film 14 are exposed from the sealant SE at the substrate end portion 10E. Similarly, in the counter-substrate CT, the respective end faces of the light-shield layer 31 and segment 331 are exposed from the sealant SE at the substrate end portion 30E.

The first alignment film AL1 lies between the fourth insulation film 14 and the sealant SE. Specifically, the entirety of the lower surface of the sealant SE on the array substrate side is in close contact with the first alignment film AL1. The second alignment film AL2 lies between the overcoat layer 33 and the sealant SE. Specifically, the entirety of the upper surface of the sealant SE on the counter-substrate side is in close contact with the second alignment film AL2. These first alignment film AL1 and second alignment film AL2 are formed of the material in which the principal chain is composed of silica ($SiO_2$), as described above, and are strongly bonded to the sealant SE by covalent bond.

Next, an example of the operation of the liquid crystal display device in the embodiment is described.

In an OFF state in which no potential difference is produced between the pixel electrode PE and the second common electrode CE2 (i.e. a state in which no voltage is applied to the liquid crystal layer LQ), no electric field is produced between the pixel electrode PE and second common electrode CE2. Thus, as illustrated in FIG. 4, liquid crystal molecules LM included in the liquid crystal layer LQ are initially aligned substantially perpendicular to the substrate major surface (X-Y plane) between the first alignment film AL1 and second alignment film AL2. At this time, part of linearly polarized light from the backlight unit BL passes through the first polarizer PL1 and enters the liquid crystal display panel LPN. The polarization state of the linearly polarized light, which enters the liquid crystal display panel LPN, hardly varies when the light passes through the liquid crystal layer LQ. Thus, the linearly polarized light emerging from the liquid crystal display panel LPN is absorbed by the second polarizer PL2 that is in the positional relationship of crossed Nicols in relation to the first polarizer PL1 (black display).

In an ON state in which a potential difference is produced between the pixel electrode PE and the second common electrode CE2 (i.e. a state in which a voltage is applied to the liquid crystal layer LQ), a vertical electric field or an inclined electric field avoiding the slit SL is produced between the pixel electrode PE and second common electrode CE2. Thus, the liquid crystal molecules LM are aligned in a direction different from the initial alignment direction, by the effect of the vertical electric field or inclined electric field. Specifically, since negative-type liquid crystal molecules LM are aligned such that their major axes cross the electric field, the liquid crystal molecules LM are aligned in the ON state in an oblique direction or in a horizontal direction, relative to the substrate major surface.

In this ON state, the polarization state of the linearly polarized light, which enters the liquid crystal display panel LPN, varies depending on the alignment state of the liquid crystal molecules LM (or the retardation of the liquid crystal layer) when the light passes through the liquid crystal layer LQ. Thus, in the ON state, at least part of the light emerging from the liquid crystal layer LQ passes through the second polarizer PL2 (white display).

In addition, in the ON state, a storage capacitance CS is formed by the pixel electrode PE and the first common electrode CE1 that are opposed to each other via the fourth insulation film 14, and retains a necessary capacitance for displaying an image. Specifically, a pixel potential, which has been written in each pixel via the switching element SW, is retained in the storage capacitance CS for a predetermined period.

According to the present embodiment, the first alignment film AL1 and second alignment film AL2 are formed not of an organic material such as polyimide, but of an inorganic material in which a principal chain is composed of silica ($SiO_2$). In addition, the first alignment film AL1 and second alignment film AL2 extend at a position overlapping the sealant SE between the inner face SEI and outer face SEO of the sealant SE. Thus, regardless of the layer structures at end portions overlapping the sealant SE in the array substrate AR and counter-substrate CT, the first alignment film AL1 is located at an interface between the array substrate AR and sealant SE, and the second alignment film AL2 is located at an interface between the counter-substrate CT and sealant SE. Since the first alignment film AL1 and second alignment film AL2 are strongly bonded to the sealant SE by covalent bond, the strength of adhesion to the sealant SE can be improved. Therefore, it is possible to suppress peeling between the array substrate AR and counter-substrate CT in the liquid crystal display panel LPN.

The inventor prepared a liquid crystal display panel which has been described in the embodiment, and a liquid crystal display panel of a comparative example, and measured the force (strength of adhesion) that is necessary for peeling between the array substrate AR and counter-substrate CT with respect to the respective liquid crystal display panels. In the liquid crystal display panel of the comparative example, both the first alignment film AL1 and second alignment film AL2 were formed of polyimide, and the same structure as in the present embodiment was adopted. According to the liquid crystal display panel of the present embodiment, a strength of adhesion, which is about three times higher than the liquid crystal display panel of the comparative example, was obtained. The reason for this is that in the liquid crystal display panel of the comparative example, the sealant SE is ionic-bonded to the first alignment film AL1 and second alignment film AL2, whereas in the liquid crystal display panel of the present embodiment, the sealant SE is covalent-bonded to the first alignment film AL1 and second alignment film AL2.

In addition, according to the present embodiment, each of the first alignment film AL1 and second alignment film AL2 extends at a position overlapping the sealant SE, and each end face thereof is exposed from the sealant. However, since the first alignment film AL1 and second alignment film AL2 are formed of the inorganic material, the moisture absorption is very small, compared to the organic material.

Furthermore, in the array substrate AR, the third insulation film 13, which is formed of the organic material, has the end face 13E on the inside of the substrate end portion 10E, and this end face 13E is covered with the fourth insulation film 14 and first alignment film AL1 which are formed of the inorganic material. Thus, there is no path of moisture entering the third insulation film 13 from the outside. In addition, in the counter-substrate CT, although the segment 331 of the overcoat layer 33 is exposed on the substrate end portion 30E side, the segment 331 is separated from the segment 332 which is located on the inner side, and this overcoat layer 33 is covered with the second alignment film AL2. Thus, a path of moisture entering the overcoat layer 33 from the outside is made discontinuous between the segment 331 and segment 332. Thereby, it becomes possible to suppress damage to the liquid crystal display panel LPN due to moisture.

The inventor prepared a liquid crystal display panel which has been described in the embodiment, and a liquid crystal display panel of a comparative example, and conducted an operation test for displaying an image, after each liquid display panel was left for 500 hours in a high-temperature, high-humidity environment (temperature: 60° C., humidity: 95%). The structure of the liquid crystal display panel of the comparative example is as described above. As regards the liquid crystal display panel of the comparative example, a display defect was confirmed when an image was displayed. However, as regards the liquid crystal display panel of the present embodiment, no display defect was confirmed when an image was displayed.

Therefore, according to the present embodiment, the reliability can be enhanced.

Furthermore, according to the embodiment, the capacitance, which is necessary for displaying an image in each pixel, can be formed by the pixel electrode PE and first common electrode CE1 which are opposed via the fourth insulation film 14. Thus, when the capacitance is formed, a wiring line or electrode, which crosses the pixel and is formed of a light-shielding wiring material, is needless. In addition, the fourth insulation film 14 is formed to have a smaller film thickness than the third insulation film that is formed of a resin material or the like. Therefore, a relatively large capacitance can easily be formed by the pixel electrode PE and first common electrode CE1 which are disposed via the fourth insulation film 14.

Moreover, since each of the pixel electrode PE and first common electrode CE1 is formed of a transparent, electrically conductive material, an area overlapping the pixel electrode PE and first common electrode CE1 contributes to display. Thus, compared to a comparative example in which a storage capacitance line crossing the pixel is disposed, the aperture ratio which contributes to display, transmittance or luminance per pixel, can be improved. Therefore, while the capacitance necessary for display is secured, the display quality can be improved.

In addition, the first common electrode CE1 extends above the source line S1 and source line S2. Thus, in the ON state, an undesired leak electric field from the source line toward the liquid crystal layer LQ can be shielded by the first common electrode CE1. Specifically, it is possible to suppress formation of an undesired electric field or an undesired capacitance between the source line and the pixel electrode PE or second common electrode CE2, and to suppress disturbance in alignment of liquid crystal molecules LM in an area overlapping the source line.

Furthermore, the liquid crystal molecules LM in the area overlapping the source line maintains the initial alignment state even in the ON state, since the first common electrode CE1 and second common electrode CE2 are kept at the same potential. Therefore, pixel electrodes PE neighboring in the first direction X can be located closer to each other up to a processing limit, and the area which contributes to display per pixel can further be increased.

Besides, even when one of the pixels neighboring with the source line interposed is in the ON state and the other is in the OFF state, there is no potential difference, by the first common electrode CE1 and second common electrode CE2, in the liquid crystal layer on the source line between the ON-state pixel and OFF-state pixel. Thus, the liquid crystal molecules LM in the area overlapping the source line are kept in the initial alignment state. Therefore, even when the liquid crystal display panel LPN is viewed in an oblique direction, degradation in display quality due to color mixing can be suppressed. In addition, since there is no need to increase the width of the light-shield layer 31 in order to prevent color mixing, the area contributing to display per pixel can further be increased.

As has been described above, according to the present embodiment, a liquid crystal display device, which can enhance reliability, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
an insulative substrate;
a first inorganic insulation film above the insulative substrate;
an organic insulation film stacked on the first inorganic insulation film;
a second inorganic insulation film stacked on the organic insulation film;
a third inorganic insulation film stacked on the second inorganic insulation film;
a plurality of pixel electrodes; and
a common electrode opposed to the plurality of pixel electrodes; wherein
the insulative substrate includes a substrate end portion,
the organic insulation film includes an end face located around the substrate end portion,
the first inorganic insulation film is exposed from the organic insulation film at a region between the end face and the substrate end portion,
a first part of the second inorganic insulation film contacts the end face of the organic insulation film,
a second part of the second inorganic insulation film contacts the first inorganic insulation film at the region between the end face and the substrate end portion,
a third part of the third inorganic insulation film contacts the first part of the second inorganic insulation film, and
a fourth part of the third inorganic insulation film contacts the second part of the second inorganic insulation film at the region between the end face and the substrate end portion.

2. The display device of claim 1, wherein the first part of the second inorganic insulation film is provided between the third part of the third inorganic insulation film and the end face of the organic insulation film.

3. The display device of claim 1, wherein
the common electrode is between the organic insulation film and the second inorganic insulation film, and
the plurality of pixel electrodes is between the second inorganic insulation film and the third inorganic insulation film.

4. The display device of claim 3, wherein
the third inorganic insulation film is an alignment film, and
the alignment film is formed of a material in which a principal chain is composed of silica.

5. The display device of claim 1, further comprising:
a sealant, wherein
the third part of the third inorganic insulation film contacts the sealant, and
the fourth part of the third inorganic insulation film contacts the sealant.

6. The display device of claim 5, wherein
the sealant includes an inner face and an outer face,
the end face of the organic insulation film is between the inner face and the outer face, and
the outer face of the sealant overlaps the substrate end portion of the insulative substrate.

7. The display device of claim 1, wherein
the first inorganic insulation film, the organic insulation film, the second inorganic insulation film, and the third inorganic insulation film are stacked in this order at a region inside the end face of the organic insulation film, and
the first inorganic insulation film, the second inorganic insulation film, and the third inorganic insulation film are stacked in this order at the region between the end face and the substrate end portion.

* * * * *